United States Patent [19]
Curry

[11] Patent Number: 5,826,379
[45] Date of Patent: Oct. 27, 1998

[54] HIGHLY WIND RESISTANT PRE-ASSEMBLED RELOCATABLE BUILDING STRUCTURE

[76] Inventor: Paul Curry, 540 Park Blvd., Apt. J-54, Marion, Va. 24355

[21] Appl. No.: 998,673

[22] Filed: Dec. 30, 1992

[51] Int. Cl.$^6$ .............................. E04H 1/00; E04H 9/00
[52] U.S. Cl. .............................. 52/79.1; 52/79.9; 52/295; 52/299; 52/57; 52/272; 52/293.3; 52/800.1
[58] Field of Search .................... 52/79.1, 57, 79.13, 52/79.9, 90.2, 272, 822, 293.3, 79.11, 295, 296, 299, 235

[56] References Cited

U.S. PATENT DOCUMENTS

| | | |
|---|---|---|
| 1,142,253 | 6/1915 | Harris . |
| 1,184,673 | 5/1916 | Fardon . |
| 1,239,740 | 9/1917 | Tatum . |
| 1,453,996 | 5/1923 | Riddle . |
| 1,913,066 | 6/1933 | Carter . |
| 2,387,229 | 10/1945 | Auten .................... 52/299 X |
| 2,858,916 | 11/1958 | Josephs . |
| 2,904,849 | 9/1959 | Bergstrom ............... 52/299 X |
| 3,011,601 | 12/1961 | Perlin . |
| 3,107,755 | 10/1963 | Thibert . |
| 3,135,070 | 6/1964 | Waring et al. ............ 52/272 X |
| 3,229,431 | 1/1966 | Paul ........................ 52/79.13 |
| 3,279,132 | 10/1966 | Slayter ................... 52/79.9 X |
| 3,296,756 | 1/1967 | Wade . |
| 3,461,633 | 8/1969 | Ziegelman et al. ...... 52/79.9 X |
| 3,717,965 | 2/1973 | Morton et al. ............ 52/79.1 |
| 3,719,015 | 3/1973 | Misawg .................... 52/299 |
| 3,795,336 | 3/1974 | Acker et al. . |
| 3,798,853 | 3/1974 | Castle ..................... 52/57 X |
| 3,822,519 | 7/1974 | Antoniou ................ 52/79.13 |
| 3,845,592 | 11/1974 | Patena .................... 52/293.3 |
| 3,913,286 | 10/1975 | Boutacoff ............... 52/79.1 X |
| 3,921,355 | 11/1975 | Pennecot . |
| 4,071,984 | 2/1978 | Larrow . |
| 4,269,006 | 5/1981 | Larrow . |
| 4,275,533 | 6/1981 | Wright . |
| 4,464,877 | 8/1984 | Gebhardt et al. ........ 52/79.1 X |
| 4,531,338 | 7/1985 | Donatt . |
| 4,573,292 | 3/1986 | Kaufman et al. . |
| 4,594,822 | 6/1986 | Marschak . |
| 4,738,061 | 4/1988 | Herndon ................. 52/299 X |
| 4,765,104 | 8/1988 | Boot . |
| 4,833,841 | 5/1989 | Ellington, III . |
| 4,879,850 | 11/1989 | Glassco et al. . |
| 4,947,615 | 8/1990 | Peacock . |
| 5,036,638 | 8/1991 | Kurtz, Jr. . |
| 5,094,048 | 3/1992 | Woo . |

FOREIGN PATENT DOCUMENTS

1011917  12/1965  United Kingdom .................... 52/79.9

*Primary Examiner*—Rodney M. Lindsey
*Attorney, Agent, or Firm*—Rader, Fishman & Grauer

[57] ABSTRACT

In order to provide a pre-assembled, relocatable building structure which can be transported by road from one site to another, a metal skeleton which is formed of 6×2 inch rectangular cross-section hollow steel tubing, is welded together and provided with horizontally extending anchor brackets at the bottom of each vertically extending column member. These anchor pads allow the building to be lowered onto foundations in which anchor bolts are imbedded, and bolted in place. The foundations are formed so as to take the form of continuous elongate blocks which break the passage of wind which tends to flow sideways under the housing structure. A shallow crawl space can formed between the foundation blocks to facilitate service connections. To prevent winds from tearing off side and roof panels of roof and wall structures secured to the skeleton, metal brackets are used to enclose or encapsulate the edges of the panels in a manner which prevents the direct contact with the wind.

17 Claims, 11 Drawing Sheets

HIGHLY WIND RESISTANT PRE-ASSEMBLED RELOCATABLE BUILDING STRUCTURE

BACKGROUND OF THE INVENTION

1. Field of the Invention

The present invention relates generally to prefabricated housing structures and more specifically to a prefabricatable housing structure which exhibits a high resistance to high winds such as produced by hurricanes and the like and which also exhibits sufficient structural rigidity to permit the structure to be transported by road from one site to another.

2. Description of the Prior Art

Relatively low cost housing such as mobile homes which are set up in trailer parks and the like, or structures such as temporary/emergency accommodations, hospitals and the like which are erected at or near disaster/construction sites have suffered from the drawbacks that very little thought has been given to rendering the structures resistant to high winds. By way of example, in the case of mobile homes (viz., transportable house structures which are sufficiently large that they can be used as homes), it is often the case that the structure is mounted on a channel steel chassis-like arrangement and is towed to a site by a prime mover and then left sitting on the wheeled bogeys which were used to road transport the unit and/or set on a number of concrete or brick columns. The ends of the structure are usually tied down using steel cable or the like.

However, under these circumstances the house structure usually tends to be propped up 2–3 feet above the level of the ground on which it is supported and therefore in a position which allows the relatively unrestricted passage of high velocity winds therebeneath. This of course means that large upwardly acting forces can be produced by the winds acting on the underside of the housing structure and thus place a large strain on the ties which are intended to tether the structure to the ground. Should the force and/or gusting of the wind which frequently accompanies strong storms such as hurricanes, loosen or disconnect the tethering, the structure can then be lifted off its supports and or turned over. In either event, large structural damage is inevitable and places the safety of any occupants in great jeopardy.

Even in the case where the tethering remains intact, the roof and/or side walls are apt to be torn off by the wind catching beneath overhanging or terminal edge portions of panels or sheets which form part of the roof and/or side walls.

In the latter case, it is usual that if one panel or member of the housing structure can be lifted up and/or removed by the action of the wind, the structure is rendered so susceptable to pneumatic erosion that a snowball effect results, and the whole building is apt to be torn apart or badly destroyed. Viz., once the building structure is compromised by the removal of a single exterior panel, the inner structure, which is never intended to be exposed to external influences and which is definitely not designed to withstand high velocity air flows, is then exposed and usually removed/damaged by the pneumatic forces. Hence, once one part of the house is removed, the remaining structure is usually left at the mercy of the storm and progressively undergoes severe damage.

It is therefore felt that there is a unfulfilled need for an economical housing structure which sufficiently large that it can be used as a home, which is highly resistant to high winds such as produced by powerful storms, which can be prefabricated, which is sufficiently light that it can moved either as a whole unit or in connectable segments, by road transport, to site wherein it will be put into use, and which can very quickly set and connected in place.

SUMMARY OF THE INVENTION

It is an object of the present invention to provide a housing structure which can be prefabricated and moved to a site where it will be occupied, and which is highly resistant to the effects of high velocity winds and the like.

It is another object of the present invention to provide a housing structure which can be assembled at one site and then readily road transported to another wherein it can be very quickly mounted on pre-prepared foundation members.

It is a further object of the present invention to provide a transportion arrangement which facilitates the road transportation of the housing structure both to and from the site wherein it is occupied and/or put into actual use.

It is yet another object of the present invention to adapt the framework of the housing structure so that placement on a dedicated transportation arrangement is facilitated and once in place, forces which are applied to the housing structure framework are generally compressive and thus attenuates any tendency for nails, screws and the like type of fastening elements to be pulled out of place under the influence of tensile forces.

One of the major features of the present invention comes in that the inventive structure is based on a tubular metal structure which is provided with a number of anchor pads which enable the structure to be bolted to a pair of parallel concrete foundation members in which anchor bolts are set. The metal tubing is also arranged to jut out from the surfaces of the building to define rib-like projections which extend up the sides of the building sides and across the building roof at spaced intervals. These ribs function to break wind which strikes thereagainst and form what can be considered to be air dams or pockets of relatively still air in regions where side edges of structural panels are located. This serves to reduce the wind velocity at these sites and greatly attenuate the chances of panel lifting pneumatic forces being generated.

A further major feature comes in that essentially all of the terminal edges of panels which comprise the wall and roof structure are encapsulated by metal brackets. This seals off the openings into which high velocity winds can force their way and produce pneumatic forces which can pry the panels away from their intended positions.

Another feature of the invention comes in that the tubular metal structure allows a concrete patio or car park to be connected to the metallic tubular structure and thus add to the forces which tend to hold the building as a whole on its foundations and thus prevent the structure from being overturned.

Another feature of the invention comes in that the metal framework is bolted to foundations which are formed so as to continuously extend lengthwise along the sides of the building and thus greatly reduce the surface area which can be acted on by high velocity air flows in a manner which produces uprooting type forces.

A further feature of the invention comes in that, in the case of larger type structures, the building can be carried to a selected site in sections, placed on the foundations in very close proximity to each other and then drawn together in a manner which establishes a sealing connection therebetween, using bolts or the like type of fastening arrangements. In this instance the anchor pads can be formed with suitably elongate holes which allow the individual structures to be placed on the foundations such that the anchor bolts pass therethrough while still allowing for the relative movement of the structures with respect to the foundations.

More specifically, a major aspect of the present invention comes in a pre-assembled, relocatable building structure which can be transported in completed form and which can be set on foundation members, comprising: a metallic skeleton formed of a plurality of pairs of vertically extending column members, longitudinally extending side beam members and laterally extending cross beam members, the side beam and cross beam members being permanently connected to the column members at a level proximate the lower end thereof, the skeleton further including a plurality of angled portions, each of the angled portions being permanently connected to the upper ends of a pair of the column members; a plurality of horizontally extending anchor pads which are each permanently secured to a bottom of a column member, each anchor pad being formed with a hole through which a bolt which is set in a foundation member and which extends vertically upward, can be inserted, the anchor pads being arranged to seat on the foundation members and to elevate the side beam members so as to define a small clearance between the lower surface of the side beam members and the upper surface of the foundations; a floor structure supported on the side and cross beam members; a wall structure disposed between the vertically extending column members, and a roof structure disposed between the angled portions.

BRIEF DESCRIPTION OF THE DRAWINGS

The various objects and attendant advantages of the present invention will become more clearly appreciated as the following description of the preferred embodiments of the invention is given with reference to the accompanying drawings in which.

DETAILED DESCRIPTION OF THE PREFERRED EMBODIMENTS

Figure 1:
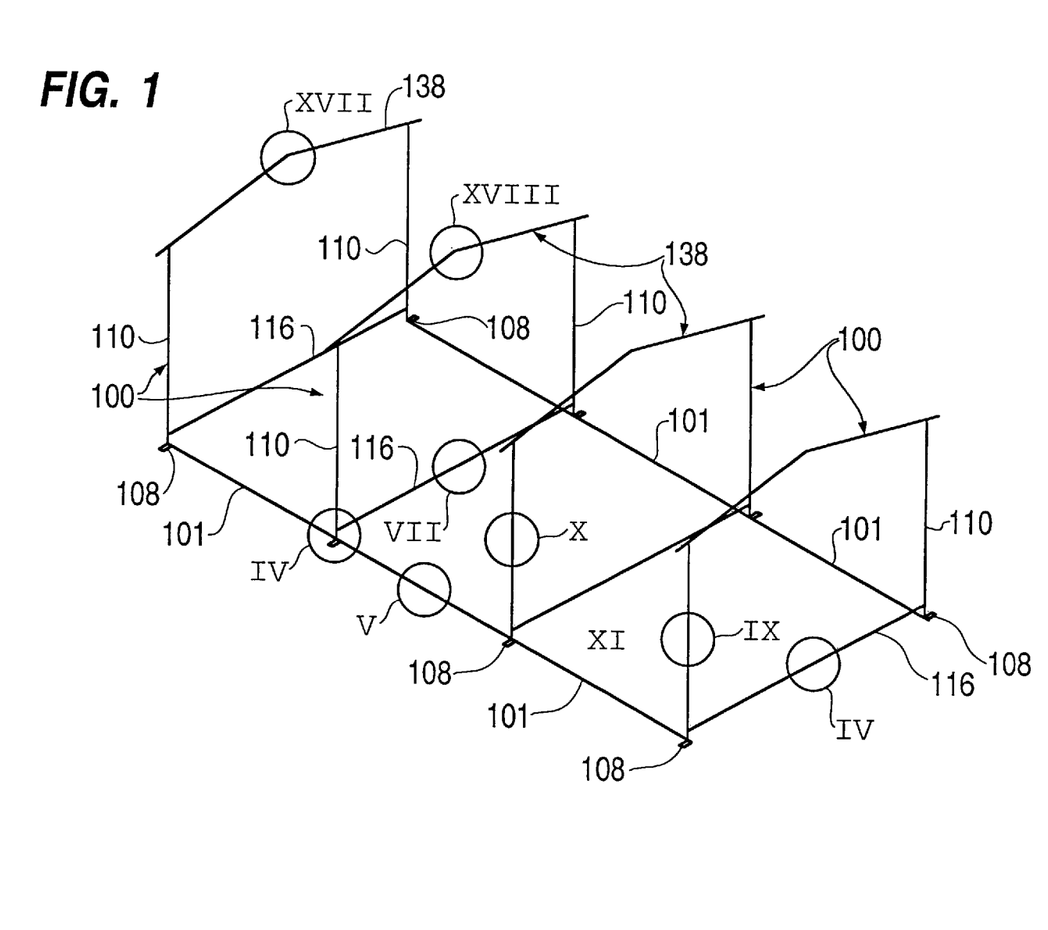
FIG. 1 is a perspective view which schematically illustrates the skeletal structure which is formed of tubular steel and which characterizes a first embodiment of the present invention.

FIG. 1 of the drawings schematically depicts a metallic tubular skeleton or framework which forms a vital part of a first embodiment of the present invention. As will become more clearly appreciated as the detailed description of this embodiment unfolds, a number of vertical tubular steel frame arrangements generally denoted by the numeral 100, are produced and then interconnected by longitudinally extending lower tubular steel side beam members 101. Following this, units which can be prefabricated from wooden and/or the like types of components/materials can be moved into the cell-like spaces defined between the vertical tubular steel frame arrangements 100 and the final connections between the steel and the "cell units" can be completed. After this, the roof and side panels can be set in place and fastened in position.

While the invention is not limited to this procedure, it is envisaged at this time that this procedure would, in light of the current state of the prefabricated building art, be the most time economical approach the completion of the building structure.

Figure 2:
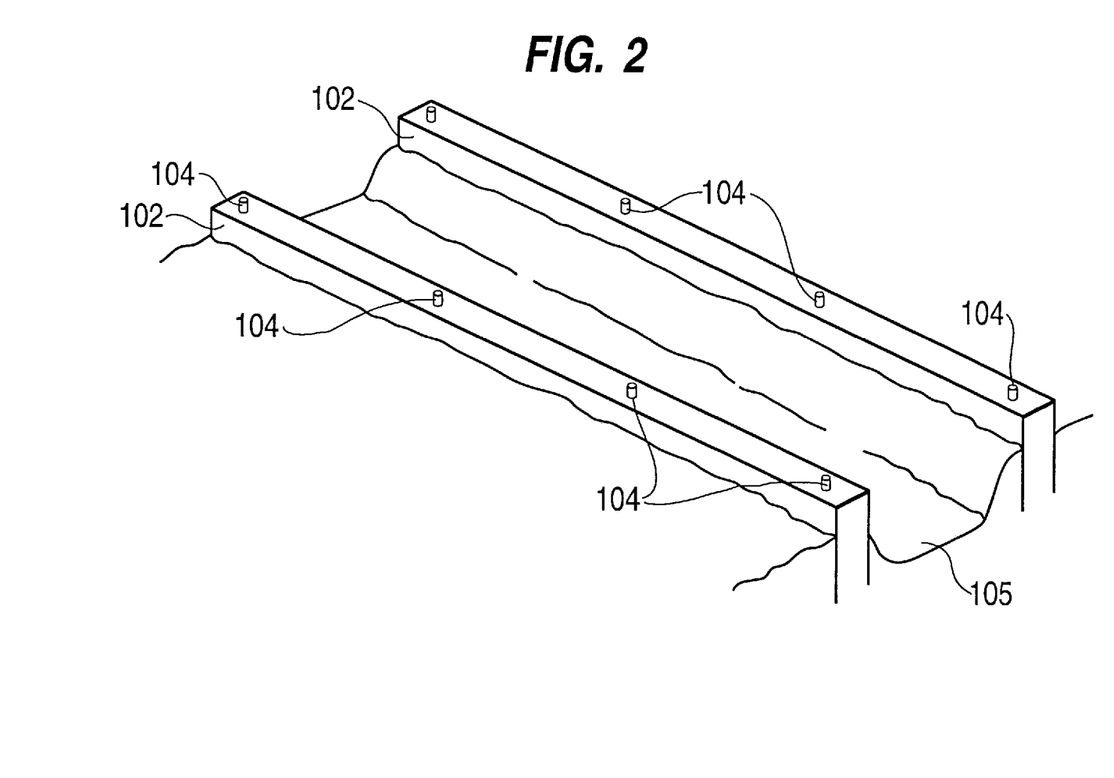
FIG. 2 is a perspective view showing an example of foundations on which the housing structure shown in FIG. 1 is adapted to be set, and the provision of a recess which defines a crawl space below the floor to enable water, electricity and the like type of services to be connected.
Figure 3:
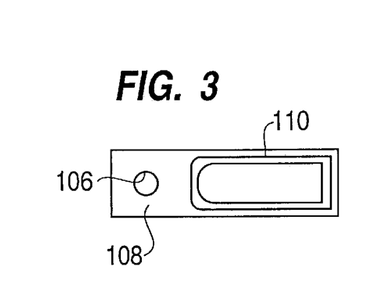
FIG. 3 is a plan view of an anchor pad which is used to connected the metallic tube framework shown in FIG. 1 to the foundations shown in FIG. 2.

In order to reduce the amount of time needed to set up the prefabricated housing structure, the foundation arrangement of the nature illustrated in FIG. 2 should be formed prior the arrival of the housing structure per se. As shown, the foundation arrangement includes two parallel re-enforced cement blocks which are set in the earth. Each of the blocks 102 have a predetermined number (four in this case) vertically oriented bolts 104 set therein at predetermined spacings. A crawl space 105 is formed by removing some of the soil from between the two blocks 102.

When the building structure is placed on the foundations the bolts 104 which project up from the cement blocks pass through holes 106 formed in anchor pads 108 which are welded to the bottom of the vertical oriented "column" members 110. This allows nuts to be threaded onto the bolts 104 and structure very quickly tightened down into place. Following this, connection of the electricity, water and the like type of services can be accomplished via the provision of the crawl space 105.

Figure 4:
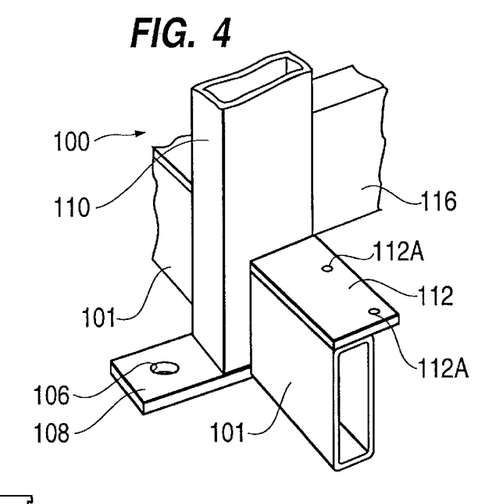
FIG. 4 is a perspective view showing the manner in which an anchor pad is connected with the metallic tube framework and other features of a portion of the latter such as exist at the junction enclosed in circle IV of FIG. 1.

This first embodiment is such that the metal tubular structure is formed almost entirely of 6×2 inch rectangular cross-section hollow tubular steel. As shown in FIG. 4 the anchor pads 108 are welded to the bottom of the vertically oriented columns 110, so that they project laterally outward from the structure. The column 110 depicted in FIG. 4 forms part of one of the intermediate tubular steel frame arrangements, and therefore has a side beam 101 is welded to each of the major (6 inch) sides thereof. In this instance the side beams 101 are connected to the middle of the column 110 so that approximately a two inch clearance exists on either side. A 4×¼ inch metal plate 112 is welded to the top of each of the side beams in the manner depicted in this figure. It is preferable (but not essential) that the inboard edge of the metal plates 112 terminate at a level which is flush with the inner edge of the vertical columns 110.

Figure 11:
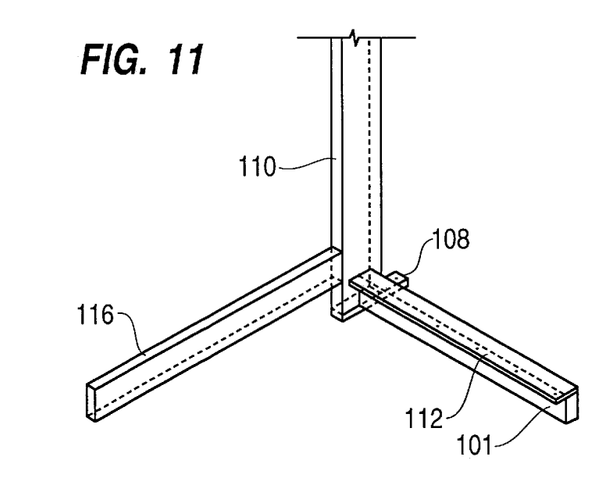
FIGS. 11 and 12 are perspective views showing the arrangement of a corner of the framework as seen from within the same, and which show the framework with and without the wooden header and floor joists which form part of the completed structure.
Figure 12:
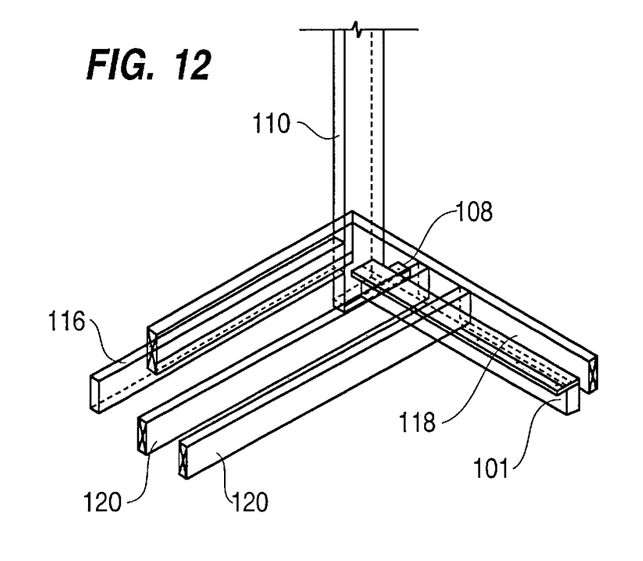
Figure 13:
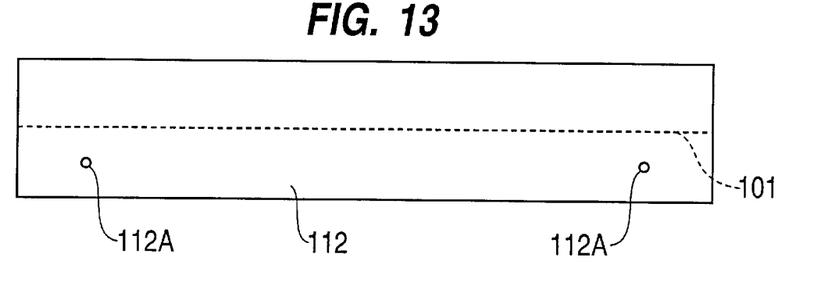
FIGS. 13 and 14 are plan views showing the arrangement of a metal plate which is welded to the top of one of the lower tubular side frame member and the manner in which header and floor joists are disposed therewith.
Figure 14:
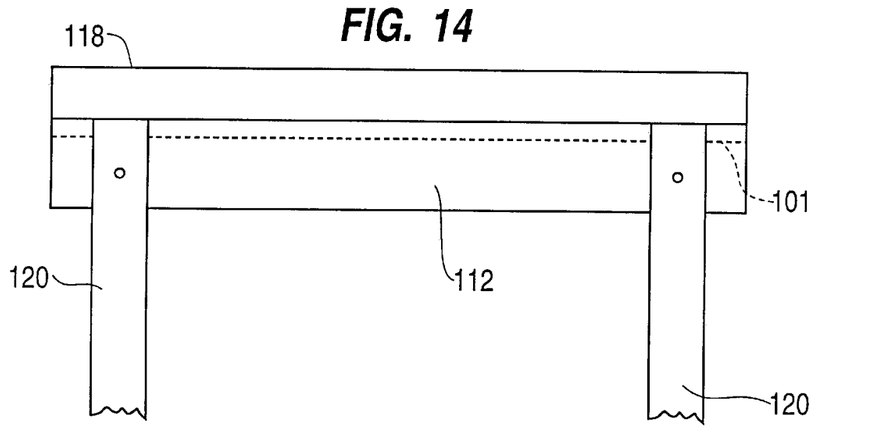

Spanning or cross beams 116 which are formed of 6×2 inch rectangular cross-section steel tubing, are welded to the inner edges of the vertical column in the manner apparent from FIG. 4 and 11. As will be appreciated from these figures the cross beams 116 are arranged at a level which is higher than the side beams 101.

The purpose of the 4×¼ inch plates 112 is to support headers 118 and the ends of the floor joists 120. The arrangement of these elements which is used in the first embodiment is shown in FIGS. 5, 12, 13 and 14. As will be appreciated from these views, the metal plates 112 are formed with a number of through holes 112A, through which suitable screws are screwed into the lower surfaces of the floor joists 120.

Figure 5:
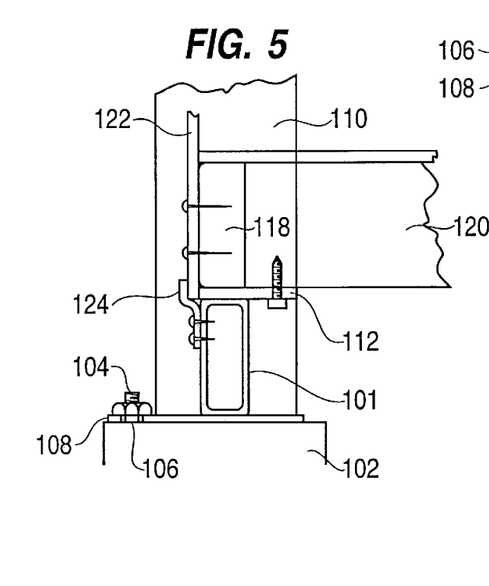
FIG. 5 is a side sectional elevation of a lower longitudinal extending frame portion such as enclosed in circle V of FIG. 1 and which shows the manner in which wooden headers, floor joists, floor sheeting and outer wall panel are arranged therewith.

The lower ends of the side wall sheets 122 are nailed to the sides of the headers which in this instance are made of 10×2 inch pieces of lumber.

Figure 9:
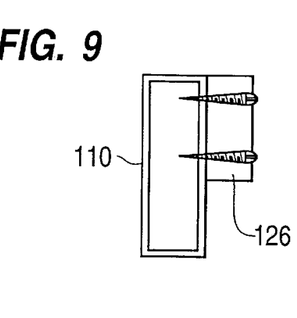
FIGS. 9 and 10 are sectional views of the portions of the framework enclosed in circles IX and X of FIG. 1.
Figure 10:
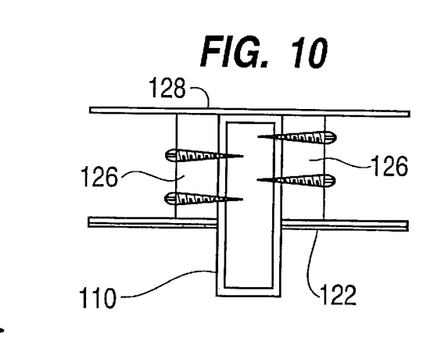

In order to facilitate construction and to encapsulate or enclose the lower edges of the side wall sheets, elongate side wall bracket members 124 are attached to the sides of the side beams 101 in the manner illustrated in FIG. 5. These brackets 124 can be screwed in place or welded or both as meets the situation. These side wall brackets 124 are such that the side wall sheets 122 can be inserted into the channel defined between the brackets 124 and the side beams 101 and then pushed into the desired flat position while nails or the like type of fasteners are driven therethrough into the headers 118 and other wooden elements such as studs 126 or the like which are used to construct the side walls of the building. The studs 126 are, as shown in FIGS. 9 and 10, screwed into position against the sides of the vertical columns 110. It will be noted that FIG. 9 depicts the situation which occurs at the ends of the building while FIG. 10 depicts the arrangement which occurs at the intermediate columns. In FIG. 10 an inner wall sheet (½ inch dry wall sheet) is shown disposed against the studs 126 and in a manner which conceals the inner edges of the vertical columns 110.

Figure 6:
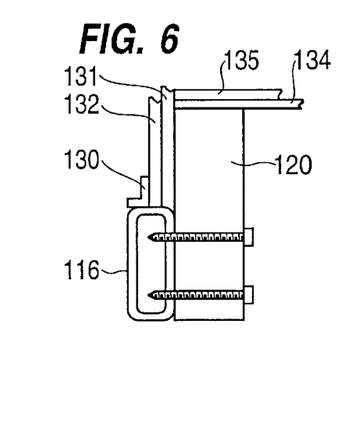
FIG. 6 is a side sectional elevation of a lower laterally extending frame portion such as enclosed in circle VI of FIG. 1 and which shows the manner in which end wall structure is arranged therewith.

In order to encapsulate the lower edges of the end wall sheets, an L-shaped bracket 130 is welded to the upper outer edge of each of the end cross beams 116 so as to define a channel between the end floor joist 120 and itself and thus provide a space into which the end wall sheets 131 and 132 can be inserted.

It should be understood that the above mentioned encapsulation or enclosure of the lower ends of the sheets which form part of the end and side walls, is such as to deflect strong winds and prevents the same from catching against the edges of the sheets in a manner which may lead to the same being pried loose by pneumatically generated forces.

Figure 7:
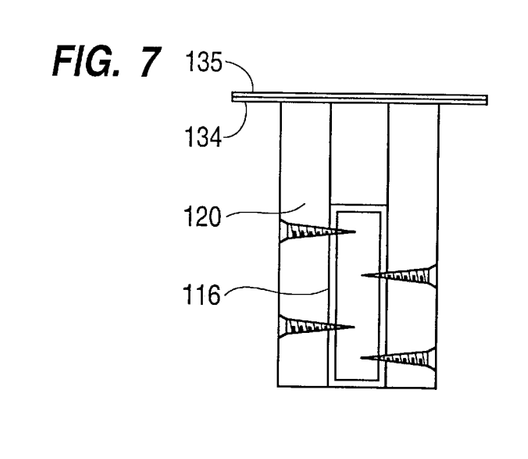
FIGS. 7 and 8 are side elevation and side sectional views of a portion of structure as enclosed in circle VII of FIG. 1.
Figure 8:
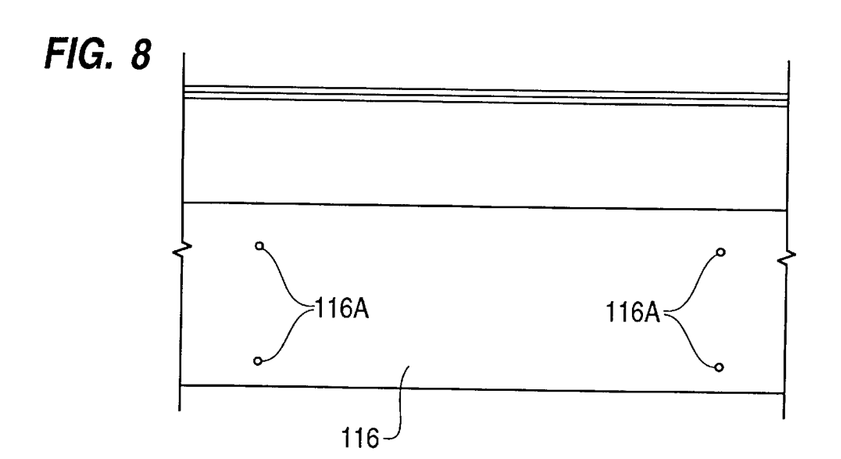

FIG. 7 depicts the manner in which the floor joists 120 are secured to the sides of the cross beams 116 by means of screws and how a floor sheeting 134 and floor covering 135 are laid over the tops of the joists. FIG. 8 is a elevation which shows the provision of drill holes 116a which formed in the cross beams 116 for receiving the screws shown in FIG. 7

Figures 15, 15A:
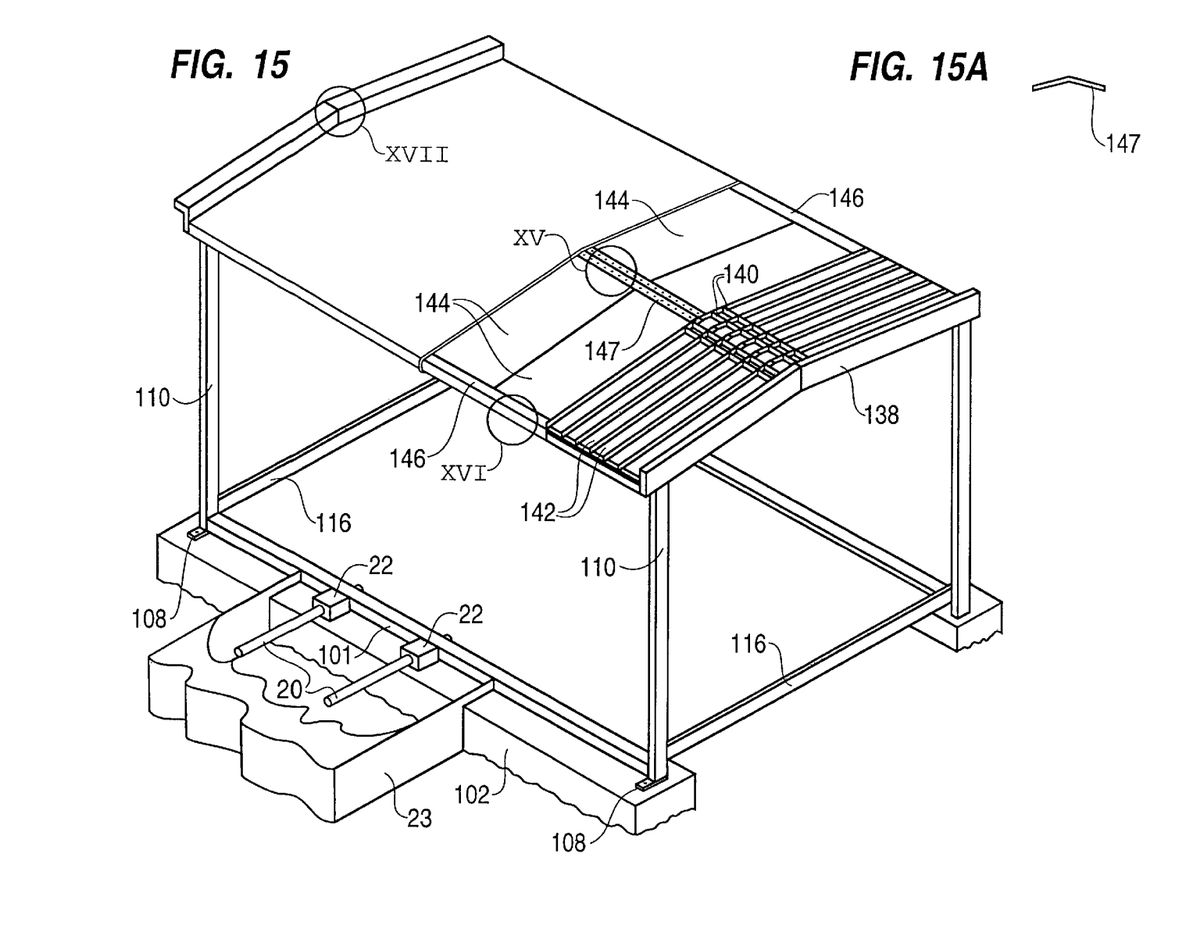
FIG. 15 is a perspective view showing the manner in which the roof is constructed in accordance with the first embodiment of the present invention.
FIG. 15A is a cross-sectional view showing a V-shaped bracket member which is provided along the ridge or crest of the roof and which is enclosed in circle XV of FIG. 15.

FIG. 15 is a staged cut-away perspective view showing the features of the roof construction which characterizes the first embodiment of the invention. As will be appreciated from FIG. 1 the roof structure is basically provided by two pieces of rectangular cross-section tubing which have been appropriate cut and welded together to define the angled roof sections 138. The ends of these angled roof sections or metal trusses 138 are welded to the tops of the vertically oriented columns 110 so as to leave a suitable amount of eave defining overhang.

Figure 16:
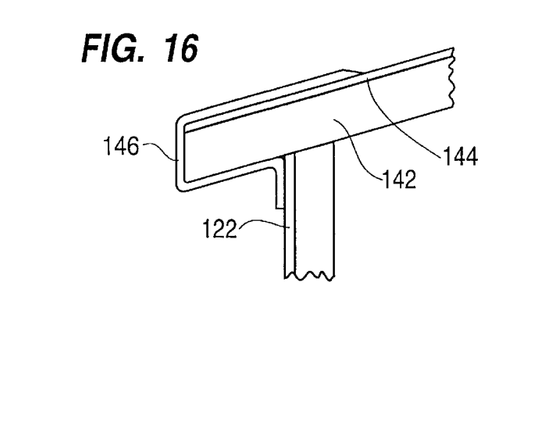
FIG. 16 is a sectional view showing the portion of the roof structure enclosed within circle XVI of FIG. 15.
Figure 17:
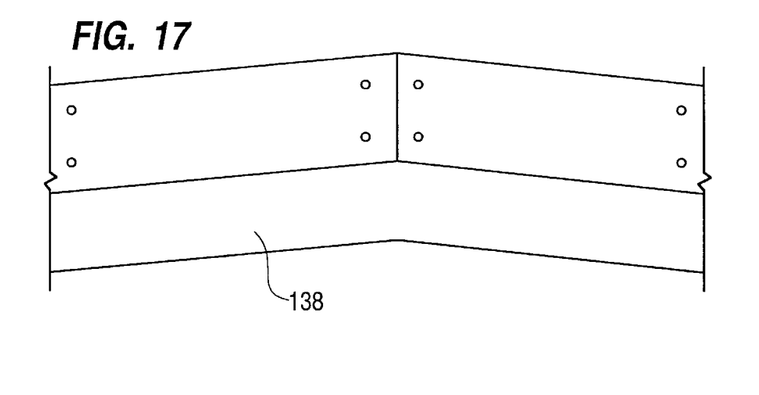
FIG. 17 is an end elevational view showing the portion of the roof structure which is enclosed in circle XVII of FIG. 15 before the application of a membrane roof sheeting.

The roof structure in this case features the use of double lock-out braces 140 between the trusses 142 on either side of the ridge. A ½ inch roof sheeting 144 is secured to the top edges of the trusses 142. In accordance with a major feature of the present invention, the eave edges of the trusses 142 and roof sheeting 144 are clamped together by a elongate metal bracket 146. This bracket 146 encapsulates the edges of the roof sheeting 144 in a manner which protects the same from exposure to pneumatically generated forces which would tend to tear the same off in a powerful storm. As best seen in FIG. 16, the bracket 146 extends over the top of the roof sheeting 144 and also extends down over the upper edge portion of the side walls sheeting 122. This latter feature ensures that winds are deflected and are thus unable to force their way between the tops of the sheeting of the side walls and the underside of the roof structure. This of course endows considerable wind resistance to the final housing structure.

An elongate bracket 147 having a cross-section of the nature shown in FIG. 15A is used to secure the upper edges of the roof sheets 144. This bracket further advances the encapsulation which prevents the effects of strong winds from having a detrimental effect on the housing structure. This bracket also endows rigidity on the roof structure and render the same resistant particularly to compressive forces which tend to be generated during transit.

Figure 18:
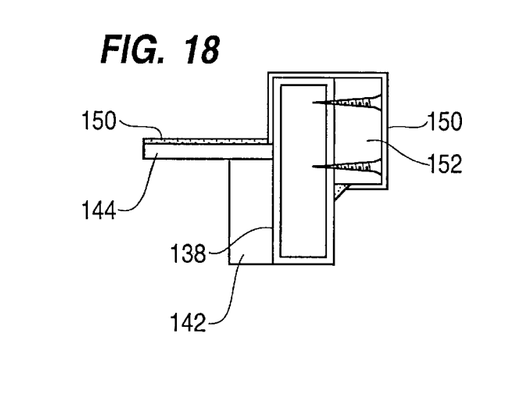
FIG. 18 is a sectional view showing the structure of an end portion of the roof which is enclosed in circle XVII of FIG. 1 after the membrane roof sheeting is applied and fastened down.

In the instant embodiment a layer of elastomeric type membrane roofing material 150 is laid over the tops of the roof sheets 144. This sheeting is preferable obtained in a pre-cut size so that the width of the sheet is a little wider than the distance defined between the angled roof sections 138. This enables the membrane sheets to be drawn over the roof structure so as to completely cover the section of roof defined between each of the rib-like projections which are defined by the upper portions of the angled roof sections 138 which extend up above the general level of the roof. In the case of the two end angled roof sections 138, the membrane roofing material is wrapped up and over the top of the rectangular cross section tubing from which the angled roof section is formed, and then down over piece of timber 152 which are fastened to the outboard faces of the tubing. The free edge of the membrane roof sheeting 150 is then clamped against the underside of the timber pieces 152 in the manner shown in FIG. 18.

Figure 19:
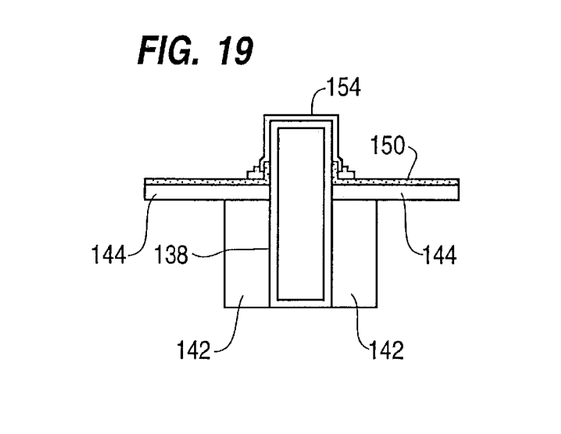
FIG. 19 is a sectional view similar to the one shown in FIG. 18 but which shows the completed roof structure at an intermediate roof portion.

In the case of the intermediate angled roof sections, the free edges of the membrane roof sheets 150 on either side of the metal tubing are arranged to extend up partially on either side of the tubing and are enclosed by an elongate sheet metal bracket 154. The free edges of the bracket 154 are then clamped down on the roof so as to secure retain the membrane roof sheeting in place.

It will be noted that in the instant embodiment the membrane roof material is selected of the type which shrinks upon exposure to predetermined conditions such as an elevated temperature. This facilitates construction in that the membrane roof can be loosely set in place, folded and clamped etc., and then allowed (or purposely induced) to shrink to a snug fit after the housing structure is completed.

Examples of roofing material/systems which can be used with the instant embodiment include those manufactured by Goodyear and which are commercially available under the trade names of Versigard Md., Versigard HP7 and Hysunite.

It will of course be understood that the present invention is not limited to the use of the above membrane type roofing materials and that the use of a variety of different roofing material techniques can be envisaged.

Figure 20:
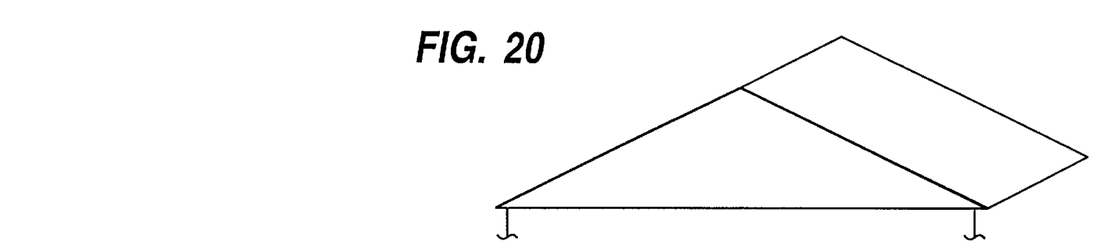
FIGS. 20, 21 and 22 respectively depict various roof widths which can characterize first second and third embodiments of the present invention and the manner in which the latter two can be moved together.

The present invention is not limited to completed units and in the case of larger structures can involve the prefabrication and transportation of a number of units which can be placed on foundations and then secured together. For example, if it is desired to very rapidly set up a hospital or hotel like structure, it is within the purview of the present invention to, instead of constructing a single wide roof of the nature shown in FIG. 20, to make the structure in two halves each having a double wide type roof configuration in the manner illustrated in FIG. 21. In other words, two units which are arranged to placed on the foundations in very close proximity to each other, and then slide the two halves in the direction of the arrows until they contact one another.

Figure 22:
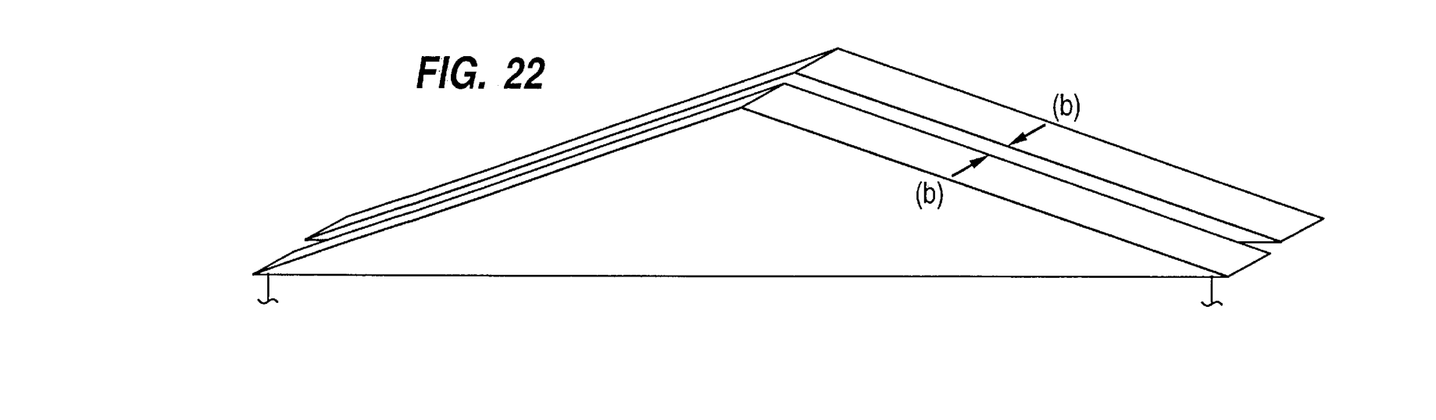

A third possibility comes in forming units which have roof arrangement more than two wide and aligning these in a row in the manner depicted in FIG. 22.

Figure 21:
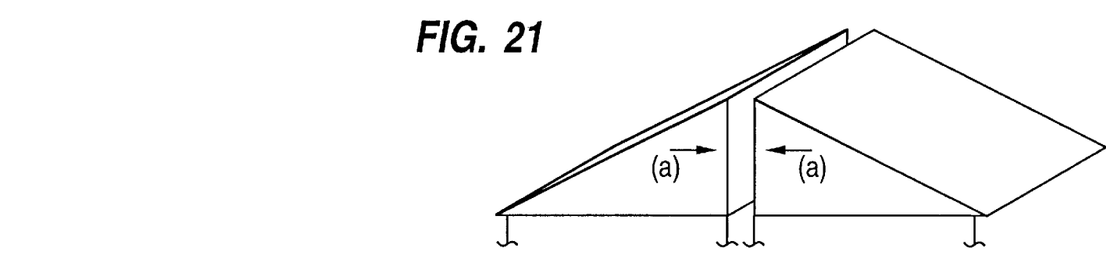

In the case of the arrangement depicted in FIG. 21 the anchor pads will need to be formed with apertures which are elongate in the wide or lateral direction of the housing structure. In the case of the larger structure shown in FIG. 22, the anchor pads will require apertures which are elongate in the length or longitudinal direction of the completed structure. As will be readily understood, the aperture elongation is necessary to allow relative movement between the units.

At this point, it is worth mentioning that the apertures formed in the anchor pads can be oversized to allow for minor incorrect positioning of the anchor bolts in the foundations. Washer-like elements can be placed over the anchor pad in the instant that the apertures approach or exceed the size of the holes through which the anchor bolts project.

Figure 23A:
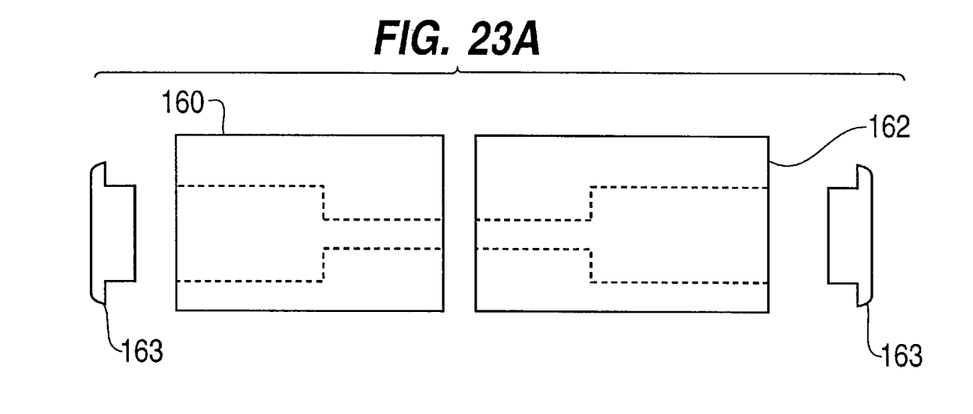
FIGS. 23A, 23B and 23C are side and end views showing the arrangement of a connector which can be used to fasten individual units according to the second and third embodiments of the present invention, together.
Figure 23B:
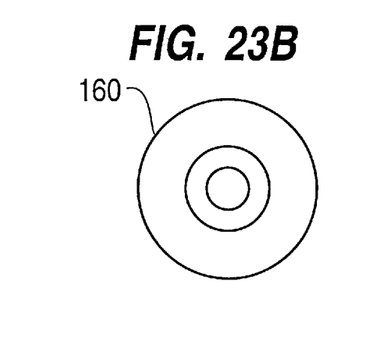
Figure 23C:
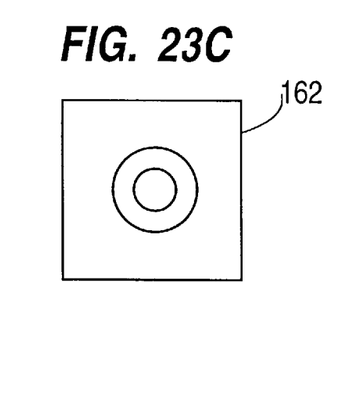

In order to facilitate the moving of the units into snug engagement with one another, the present invention contemplates the use of a number of devices which shall be referred to as "traction connectors". An example of such a device is illustrated in FIGS. 23A, 23B and 23C. These arrangements comprise metal plug components 160, 162 which can be welded into suitable apertures formed in the tubular steel which forms the basic skeleton of the housing structure(s). These components are set so as to face one another when the individual units are placed adjacent one another. One or both of the pairs can be formed by boring a stepped bore in rectangular cross-section stock. Alternatively, both can formed from circular cross-section stock. Plastic caps 163 can be provided to close and conceal the ends of the components when assembly of the housing structure is completed. A suitable bolt can be inserted into one of the elements so as to project into the one opposite the same. By tightening a nut on the bolt, a force which tends to drawn the two units together into snug engagement can be produced.

Before fastening the individual units together using a number of the above devices, suitable plastic sheeting, elongate elastomeric grommet-like seal elements, silicon sealant or the like (or a combination of the same if desired) can be set in place to seal the interface defined between the units and prevent the entrance of rain water and the like.

A further feature of the invention comes in that a patio or car park can be formed of reinforced concrete or the like in a suitable location immediately adjacent the house structure and connected to the metallic framework which forms a vital part thereof. In order to make this connection two or more holes can be drilled through one (or more depending on the length of the patio or car park) of the side beams 101 and long bolts 20 (such as used in mine constructions) disposed therethrough so as to project as shown in FIG. 15 into the site where the patio is to be formed. Wooden blocks 22 are drilled and fitted onto the bolts and move to locations proximate the outboard surfaces of the side beam in question. After this the patio can be formed by pouring concrete into a mould which is filled with re-enforcing metal members and over the extending bolts are arranged to project suitably into the mould.

Once the concrete has set, the patio slab 23 and the house are rigidly connected by the elongate bolts.

When and if the house is required to be moved, all that is required to disconnect the housing structure and the concrete patio slab 23 is to chip the concrete away sufficiently to expose the wooden blocks 22, and then split and lever and the broken pieces of block using a crowbar or the like. This of course leaves holes in the concrete and exposes portions of each of connection bolts. This facilitates the cutting of the bolts 20 via the use of a cutting torch or mechanical cutting device (e.g. bolt cutters or the like). As the bolts are cut very close to the side beam member through which they project, they can be pulled out of the side beams and thus allow the housing structure to be disconnected from the patio slab 23. Following this, the nuts which are threaded onto the anchor bolts 104 can be removed, thus leaving the housing structure free to be lifted up off the foundations 102 and transported away.

It is worth noting that in the case of a car park, ring connection means can be embedded in the concrete slab to enable rings to be screwed into place and used with suitable wire rope or the like the tie a vehicle down in preparation for a heavy storm. Viz., as will be appreciated, a vehicle such as a car, if simply left beside the house is apt to lifted by the strong winds and moved in a manner wherein it can be damaged or become a potential danger to the house per se.

Figure 24A:
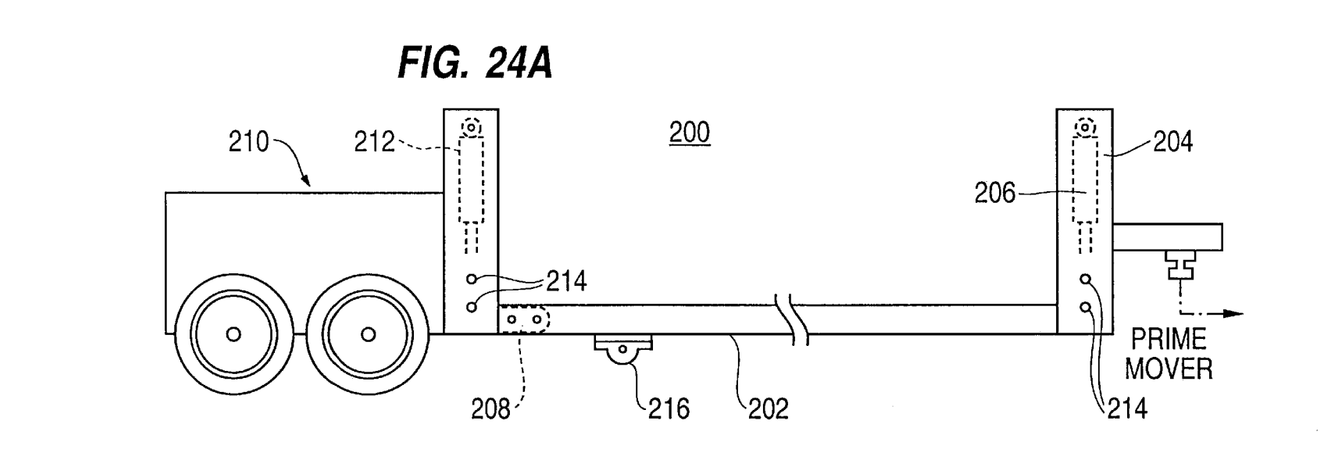
FIGS. 24A and 24B are schematic elevational views showing a transport arrangement which can be used to move the housing structures, in coupled and uncoupled conditions, respectively.
Figure 24B:
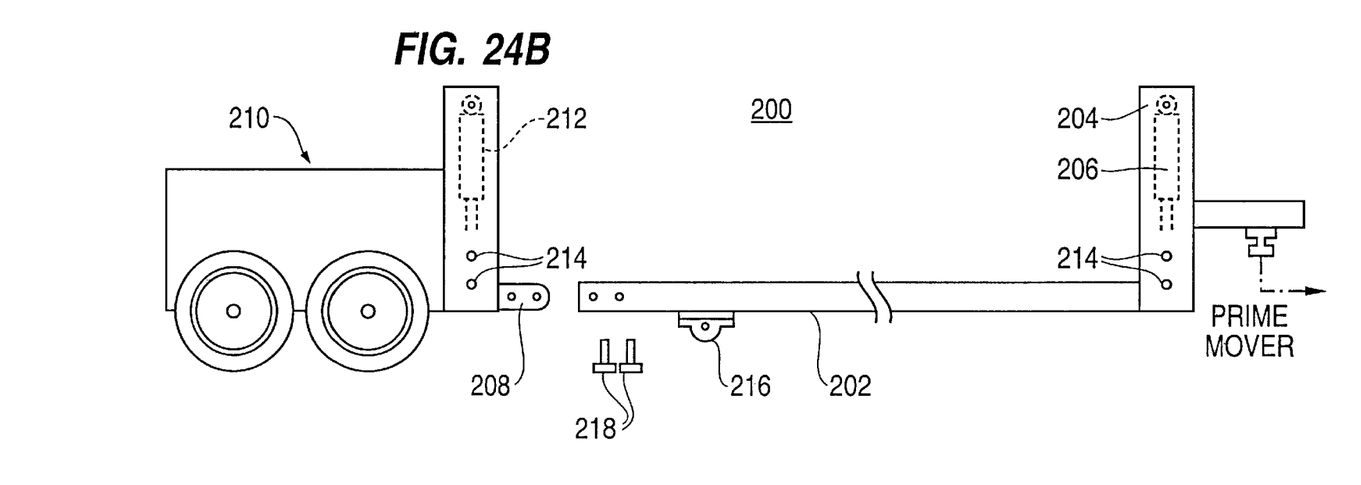

FIGS. 24A and 24B show a transport arrangement 200 which is used to transport the various housing structure embodiments of the instant invention. This arrangement includes a plurality of highly rigid steel beams 202 which are selected to possess sufficient strength to support the weight of a housing structure which is loaded thereon. The forward ends of the beams are connected to a forward servo arrangement 204 which is adapted to be connected to the rear of a prime mover. This arrangement includes a hydraulic cylinder or cylinders 206 which enable the forward ends of the beams to be selectively raised and lowered or maintained in a selected position.

The rear ends of the beams are adapted to receive tongue-like members 208 which are provided on a rear wheeled carriage 210. This rear carriage 210 is also provided with a hydraulic cylinder or cylinders 212 which enable the rear ends of the beams to be selectively raised or lowered and/or maintained in a selected position.

Side frame members which are associated with the hydraulic cylinders 206 and 212 are provided with locking pin holes 214 into which locking pins (not shown) can be inserted. These pins permit the horizontal beams 202 to be locked in place so that irrespective of any accidental loss of hydraulic pressure, the beams 202 will safely remain pinned in place.

In order to load and unload the housing structure, the beams 202 can be disconnected from the rear wheeled carriage 210 via the removal of safety locking pins. For example, during loading, the rear carriage 210 can be disconnected via the removal of the pins and rollers (not shown) which are supported by roller support brackets 216 fixed to the lower surfaces of selected beams, after the leading ends of the beams have been suitably lowered via use of the forward hydraulic cylinder arrangements 206, 212, used to allow the prime mover to back up and push the beams 202 under the housing structure (which would be supported on supports essentially similar to the foundations shown in FIG. 2). After the beams 202 are passed under the structure to be transported, the rear carriage can be moved into place, and the tongues 208 pinned in position in the ends of the associated beams. After this, the forward and rear hydraulic cylinders 206 212 can be used to lift the beams 202 up into contact with the lower side of the housing structure and then to a height sufficient to allow the structure to be moved clear of the supporting foundation arrangement. The beams 202 may be maintained at this height or lowered to one suitable for road transportation once the housing structure is moved clear of the supporting arrangement. Prior moving onto a road, the beams are securely locked in place via the insertion of safety locking pins 218.

The rear wheeled carriage 210 is preferably of a width which can pass between the foundation blocks 102 and allow the prime mover to be driven to a position wherein the housing structure is located directly above the foundation blocks 102. Of course the hydraulic cylinders may need to be activate to elevate the beams to a suitable height before the housing structure is moved into position above the foundations. After the appropriate location of the housing structure is achieved, the beams can be lowered to allow the housing structure to settle onto the foundation blocks 102 in a manner wherein the anchor bolts 104 pass up through the apertures in the anchor pads 108.

Removal of the housing structure from the foundations is basically as easy as the initial setting procedure.

In the event that it is required to set the above type of structures over a pre-prepared basement (the walls of which would basically become the foundations for the prefabricated housing structure) the above mentioned rollers can be utilized to allow either the prime mover to back-up and push the structure into position (note that a number of sets of rollers maybe necessary as the rear ends of the beams project out over the void created by the basement). Alternatively, a forklift type of vehicle or "mantis-mule" as it will be referred to, can be adapted to support the rear ends of the beams and be used to drawn the same into position.

In the event that it is preferred to be able to remove the "mantis-mule" from the basement, some provision for doing the same must be provided. For example, the mule can be constructed in a modular form which can be disassembled and rolled out of a basement entrance. Alternatively, a ramp can be formed which allows the unit to be driven out of the basement. This ramp can then serve as the site for a basement entrance. The various other possibilities will be apparent to those skilled in the art to which the present invention pertains and as such no further disclosure is deemed necessary.

Although the above disclosed embodiments have been described as having the angled roof sections 138 projecting above the roof level, it is within the scope of the present invention that the roof be constructed in such a way that the wooden trusses 142 are recessed below the tops of the tubing which define the angled roof sections 138, by an amount such as ½ to ⅝ inches, and that the roof sheeting 144 be selected to have a thickness such that the tops of the sheets 144 and the metal trusses 138 are flush with one another. This enables the membrane roofing to be laid over the roof in a single sheet and thus eliminates the formation of any seams therein.

What is claimed is:

1. A pre-assembled, relocatable building structure which is highly resistant to the effect of high velocity winds, which can be transported on transport means in a completed and which can be set on foundation members, comprising:

a metallic skeleton formed of a plurality of pairs of vertically extending metallic column members, longitudinally extending metallic side beam members and laterally extending metallic cross beam members, said side beam and cross beam members being permanently connected to said column members at a level proximate the lower end thereof, said skeleton further including a plurality of angled portions, each of said angled portions being permanently connected to the upper ends of a pair of said column members;

a plurality of horizontally extending anchor pads which are each permanently secured to a bottom of a column member, each anchor pad being formed with a hole through which a bolt which is set in a foundation member and which extends vertically upward, can be inserted, said anchor pads being arranged to seat on said foundation members and to elevate said side beam members so as to define a small clearance between the lower surface of said side beam members and the upper surface of said foundation members;

a floor structure supported on said side and cross beam members;

a wall structure disposed between said vertically extending column members, a roof structure disposed between said angled portions; encapsulating means for sealing off openings which are defined between panels and into which high velocity winds can force their way and produce pneumatic forces which pry panels away from their positions; and a plurality of elongate horizontally extending metal plates which are each permanently fixed to the top horizontal surface of a side beam, said metal plates supporting headers and the ends of floor joists which form part of said floor structure.

2. A pre-assembled, relocatable building structure as claimed in claim 1, wherein said encapsulating means comprises metal encapsulating bracket means associated with said wall and roof structures for enclosing edges of panels which form a part of said wall and roof structures and for preventing direct contact of the edges with high velocity winds and for preventing the entry of high velocity winds into the openings between the panels in a manner which produces said pneumatic forces.

3. A pre-assembled, relocatable building structure as claimed in claim 1, wherein said foundation members comprise two parallel re-enforced blocks (102) between which a crawl space (105) enabling the connection of water and electrical services, is provided.

4. A pre-assembled, relocatable building structure as claimed in claim 1, wherein said a plurality of pairs of vertically extending column members and said plurality of angled portions of said metallic skeleton defines ribs which jut out from the external surfaces of the walls and the roof said housing structure and define windbreak means for reducing the force with which wind can contact sites where edges of panels which form part of the roof and wall structures are located.

5. A pre-assembled, relocatable building structure as claimed in claim 1, said vertical columns, said side beams and said laterally extending cross beam members are formed of a hollow metallic tubing.

6. A pre-assembled, relocatable building structure as claimed in claim 5 wherein said hollow metallic tubing has an essentially rectangular cross-section.

7. A pre-assembled, relocatable building structure as claimed in claim 2 further comprising an elastomeric membrane sheet type roofing material disposed over the top of said roof structure.

8. A pre-assembled, relocatable building structure as claimed in claim 1, wherein said hole in said anchor pad is oversized with respect to the bolt which is disposed therethrough, to a degree sufficient to allow for errors in placement of the bolts in foundation member.

9. A pre-assembled, relocatable building structure as claimed in claim 2 wherein said metal encapsulating bracket means comprises a third bracket which is fastened to the side of a side beam member in a manner which defines a channel into which the edge of a side wall sheet can be inserted.

10. A pre-assembled, relocatable building structure as claimed in claim 2 wherein said metal encapsulating means comprises a fourth bracket which is secured to the top of a cross beam, said fourth bracket forming a channel into which an end wall sheet can be inserted.

11. A pre-assembled, relocatable building structure as claimed in claim 1, said transporting means comprises:
 a plurality of metal beams which can be disposed beneath the housing structure;
 a wheeled carriage which can be detachably connected to the rear ends of said metal beams; and
 connector means for connecting the forward ends of said metal beams to a prime mover.

12. A pre-assembled, relocatable building structure as claimed in claim 11, wherein said wheeled carriage includes a first hydraulic servo means for selectively lifting and lowering the rear ends of said metal beams.

13. A pre-assembled, relocatable building structure as claimed in claim 11 wherein said connector means further comprises second hydraulic servo means for selectively lifting and lowering the forward ends of said metal beams.

14. A pre-assembled, relocatable building structure as claimed in claim 11, further comprising safety pin means for locking the rear ends of said metal beams in a predetermined position so that irrespective of a malfunction in said first hydraulic servo means, the position of the rear ends of said metal beams will not alter.

15. A pre-assembled, relocatable building structure which is highly resistant to the effect of high velocity winds, which can be transported on transport means in a completed form and which can be set on foundation members, comprising:
 a metallic skeleton formed of a plurality of pairs of vertically extending metallic column members, longitudinally extending metallic side beam members and laterally extending metallic cross beam members, said side beam and cross beam members being permanently connected to said column members at a level proximate the lower end thereof, said skeleton further including a plurality of angled portions, each of said angled portions being permanently connected to the upper ends of a pair of said column members;
 a plurality of horizontally extending anchor pads which are each permanently secured to a bottom of a column member, each anchor pad being formed with a hole through which a bolt which is set in a foundation member and which extends vertically upward, can be inserted, said anchor pads being arranged to seat on said foundation members and to elevate said side beam members so as to define a small clearance between the lower surface of said side beam members and the upper surface of said foundation members;
 a floor structure supported on said side and cross beam members;
 a wall structure disposed between said vertically extending column members,
 a roof structure disposed between said angled portions;
 encapsulating means for sealing off openings which are defined between panels and into which high velocity winds can force their way and produce pneumatic forces which pry panels away from their positions; and
 a plurality of elongate horizontally extending metal plates which are each permanently fixed to the top horizontal surface of a side beam, said metal plates supporting headers and the ends of floor joists which form part of said floor structure; wherein said encapsulating means comprises metal encapsulating bracket means associated with said wall and roof structures for enclosing edges of panels which form a part of said wall and roof structures and for preventing direct contact of the edges with high velocity winds and for preventing the entry of high velocity winds into the openings between the panels in a manner which produces said pneumatic forces;
 an elastomeric membrane sheet type roofing material disposed over the top of said roof structure; and
 wherein said metal encapsulating bracket means comprises a second bracket which is disposed over the top of an angled portion in a manner which encloses a free edge portion of said elastomeric membrane sheet type roofing material.

16. A pre-assembled, relocatable building structure which is highly resistant to the effect of high velocity winds, which can be transported on transport means in a completed form and which can be set on foundation members, comprising:
 a metallic skeleton formed of a plurality of pairs of vertically extending metallic column members, longitudinally extending metallic side beam members and laterally extending metallic cross beam members, said side beam and cross beam members being permanently connected to said column members at a level proximate the lower end thereof, said skeleton further including a plurality of angled portions, each of said angled portions being permanently connected to the upper ends of a pair of said column members;

a plurality of horizontally extending anchor pads which are each permanently secured to a bottom of a column member, each anchor pad being formed with a hole through which a bolt which is set in a foundation member and which extends vertically upward, can be inserted, said anchor pads being arranged to seat on said foundation members and to elevate said side beam members so as to define a small clearance between the lower surface of said side beam members and the upper surface of said foundation members;

a floor structure supported on said side and cross beam members;

a wall structure disposed between said vertically extending column members, a roof structure disposed between said angled portions;

encapsulating means for sealing off openings which are defined between panels and into which high velocity winds can force their way and produce pneumatic forces which pry panels away from their positions;

a plurality of elongate horizontally extending metal plates, wherein said encapsulating means comprises metal encapsulating bracket means associated with said wall and roof structures for enclosing edges of panels which form a part of said wall and roof structures and for preventing direct contact of the edges with high velocity winds and for preventing the entry of high velocity winds into the openings between the panels in a manner which produces said pneumatic forces;

wherein said metal encapsulating means comprises a fifth elongate essentially inverted V-shaped bracket which is disposed along the ridge of the roof and which encloses and is connected to sheets which form part of said roof structure.

17. A pre-assembled, relocatable building structure which is highly resistant to the effect of high velocity winds, which can be transported on transport means in a completed form and which can be set on foundation members, comprising:

a metallic skeleton formed of a plurality of pairs of vertically extending metallic column members, longitudinally extending metallic side beam members and laterally extending metallic cross beam members, said side beam and cross beam members being permanently connected to said column members at a level proximate the lower end thereof, said skeleton further including a plurality of angled portions, each of said angled portions being permanently connected to the upper ends of a pair of said column members;

a plurality of horizontally extending anchor pads which are each permanently secured to a bottom of a column member, each anchor pad being formed with a hole through which a bolt which is set in a foundation member and which extends vertically upward, can be inserted, said anchor pads being arranged to seat on said foundation members and to elevate said side beam members so as to define a small clearance between the lower surface of said side beam members and the upper surface of said foundation members;

a floor structure supported on said side and cross beam members;

a wall structure disposed between said vertically extending column members, a roof structure disposed between said angled portions;

encapsulating means for sealing off openings which are defined between panels and into which high velocity winds can force their way and produce pneumatic forces which pry panels away from their positions;

and an arrangement comprising:

an elongate bolt which is disposed through a side beam and which is arranged to extend out of one side of the building structure;

a wooden block which is disposed about said bolt and located proximate an outboard side of the side beam through which the bolt is disposed; and a concrete slab which is formed on the ground adjacent a foundation member and immediately beside the building structure, said wooden block and a substantial portion of said elongate bolt being buried in said concrete slab, said concrete slab being effective as a patio or a car park.

* * * * *